United States Patent [19]

Noma et al.

[11] Patent Number: 5,804,312

[45] Date of Patent: Sep. 8, 1998

[54] PROCESSABLE SHEET WITH EXCELLENT RIGIDITY AND PROCESS FOR PRODUCING THE SAME

[75] Inventors: Takeshi Noma, Minoo; Hirotoshi Ishikawa, Ikoma, both of Japan

[73] Assignee: Chisso Corporation, Osaka-fu, Japan

[21] Appl. No.: 870,605

[22] Filed: Jun. 6, 1997

Related U.S. Application Data

[63] Continuation of Ser. No. 513,611, Aug. 10, 1995, abandoned.

[30]    Foreign Application Priority Data

Aug. 12, 1994   [JP]   Japan ................................. 6-211763

[51] Int. Cl.$^6$ .................................................... B32B 27/34
[52] U.S. Cl. .......................... 428/395; 428/198; 428/373; 442/398
[58] Field of Search ................................. 428/373, 395; 442/398

[56]        References Cited

U.S. PATENT DOCUMENTS

| | | | |
|---|---|---|---|
| 4,375,532 | 3/1983 | Baer | 525/310 |
| 4,737,404 | 4/1988 | Jackson | 428/284 |
| 4,851,284 | 7/1989 | Yamanoi et al. | 428/284 |
| 4,950,541 | 8/1990 | Tabor et al. | 428/373 |
| 5,314,922 | 5/1994 | Takai | 521/33 |
| 5,466,513 | 11/1995 | Wanek et al. | 428/218 |
| 5,508,093 | 4/1996 | Mehdorn | 428/219 |

*Primary Examiner*—Helen L. Pezzuto
*Attorney, Agent, or Firm*—Fay, Sharpe, Beall, Fagan, Minnich & McKee

[57]        ABSTRACT

A processable sheet which is inexpensive and has exellent rigidity can be manufactured easily and safely without a need of any special apparatus. The sheet comprises a fibrous layer and a multi-layer film on one surface or both surfaces of the fibrous layer. The fibrous layer comprises highly entangled conjugate fibers each of which has a structure of a core and a sheath. The core is made of a high melting point-thermoplastic resin (B) and the sheath is made of a low melting point-thermoplastic resin (A). The multi-layer film comprises an outer thermoplastic resin (C) which is highly compatible with the low melting point-thermoplastic resin (A). Tho fibrous layer and the multi-layer film, as well as the contact points of the conjugate fibers, are melt-bonded to each other by a thermal treatment.

3 Claims, No Drawings

PROCESSABLE SHEET WITH EXCELLENT RIGIDITY AND PROCESS FOR PRODUCING THE SAME

This is a continuation of application Ser. No. 08/513,611 filed on Aug. 10, 1995, now abandoned.

BACKGROUND OF THE INVENTION

1. Field of the Invention

The present invention relates to a processable sheet which can be used as an interior material for automobiles, airplanes, etc. and a process for producing the sheet.

2. Background Art

Hitherto, a variety of interior materials for automobiles and the like are known, including those obtained by thermal processing of a non-woven fabric made of glass fibers and organic fibers (Japanese Patent Application Laid-open (kokai) No. 63-249754) and composite sheets in which an entangled fibrous body containing a bonding agent has been affixed to a plastic sheet (Japanese Patent Application laid-open (kokai) No. 60-162628). In use, these non-woven fabrics and composite sheets are thermally pressed and formed into ceiling materials or interior materials of door structures.

Materials containing glass fibers involve the risk of contaminating the working environment due to micropowders of glass fibers which are generated during the manufacture of the materials. Materials containing a bonding agent are also accompanied by a problem that a great amount of a bonding agent that weighs more than fibers is needed in order for all the contact points of the fibers to be bonded. In addition, it is difficult to uniformly blend fibers and a bonding agent, requiring special apparatuses and a time-consuming operation.

SUMMARY OF THE INVENTION

In view of the foregoing, it is an object of the present invention to provide a processable sheet with excellent rigidity which is inexpensive and which can be manufactured easily without causing any danger or requiring any special apparatus.

The present inventors conducted extensive studies to attain this object, and as a result, they found that a processable sheet obtained by thermally treating a structure comprising:

- a fibrous layer formed of highly entangled conjugate fibers each of which has a structure of a core and a sheath therefor, the core being made of a high melting point-thermoplastic resin (B) and the sheath being made of a low melting point-thermoplastic resin (A) and
- a multi-layer film having an outer thermoplastic resin (C) layer which is highly compatible with the low melting point-thermoplastic resin,
- the multi-layer film being placed on at least one surface of the fibrous layer, so that contact points of the conjugate fibers are melt-bonded, as well as the fibrous layer and the multi-layer film are melt-bonded to each other, meets the above criteria. The present invention was accomplished based on this finding.

The processable sheet or the present invention comprises;

- a fibrous layer and a multi-layer film on either surface or both surfaces of the fibrous layer, wherein
- the fibrous layer comprises highly entangled conjugate fibers each of which has a structure of a core and a sheath therefor, the core being made of a high melting point-thermoplastic resin (B) and the sheath being made of a low melting point-thermoplastic resin (A),
- the multi-layer film comprises an outer thermoplastic resin (C) which is highly compatible with the low melting point-thermoplastic resin, and
- contact points of the conjugate fibers are melt-bonded, and the fibrous layer and the multi-layer film are melt-bonded to each other.

A process for producing the sheet comprises,

- providing a fibrous layer and one or two multi-layer films, the fibrous layer being produced by first forming a sheet of conjugate fibers having a sheath/core structure by carding or by a random webber method, and then making the fibers entangled by needle-punching or by a spun-lace method, and the multi-layer film comprising at least one layer of a first thermoplastic resin which is highly compatible with the low melting point thermoplastic resin serving as the sheath component of the conjugate fiber and at least one layer of a second thermoplastic resin with a melting point higher than that of the first thermoplastic resin;
- superposing the multi-layer film on one surface or both surfaces of the fibrous layer; and
- subjecting the resulting layer to a heat treatment at a temperature higher than any melting point of the sheath component of the conjugate fiber or of the first thermoplastic resin of the multi-layer film but lower than any melting point of the core component of the conjugate fiber or of the second thermoplastic resin of the multi-layer film.

DESCRIPTION OF THE INVENTION AND PREFERRED EMBODIMENTS

In this specification, the term "processable sheet" is used to refer to all sheets in which at least one multi-layer film and at least one fibrous layer are unified.

In the present invention, conjugate fibers comprising a core and a sheath are used. The sheath of each conjugate fiber is formed of a low melting point-thermoplastic resin (A), and the core is formed of a high melting point-thermoplastic resin (B). Examples of the sheath/core combination include high-density polyethylene/polypropylene (in each of the following examples, the fiber composition is explained as sheath/core material), low-density polyethylene/high-density polyethylene, low melting point-polypropylene/polypropylene, high-density polyethylene/polyester (PET), low melting point-polyester/polyester, and nylon 6/nylon 66.

In the present invention, the fibrous layer is obtained by first forming a sheet of conjugate fibers having the sheath/core structure (A)/(B) by carding or by a random webber method, and then making the fibers sufficiently entangled by needle-punching or by a spun-lace method.

The multi layer film used in the present invention comprises two or three layers of films. In detail, the multi-layer film comprises at least one layer of a first thermoplastic resin (C) which is highly compatible with the low melting point-thermoplastic resin serving as the sheath component of the conjugate fiber and at least one layer of a second thermoplastic resin (D) with a melting point higher than that of the thermoplastic resin (C). When the multi-layer film contains three layers of films, the layer of thermoplastic resin (C) is placed so that it becomes the outer layer.

Examples of the combination of the layers of the multi-layer film include low-density polyethylene/high-density polyethylene, low melting point-polypropylene/polypropylene, low melting point-polyester/polyester, and nylon 6/nylon 66.

The processable sheet of the present invention is obtained by superposing the above-mentioned multi-layer film on one surface or both surfaces of the above-mentioned fibrous layer, and subjecting the resulting superposed material to a heat treatment. In this process, the thermoplastic resin (C) layer of the multi-layer film is placed on a fibrous layer so that they contact each other, and the temperature of the heat treatment is higher than any melting point of the sheath component of the conjugate fiber or of the thermoplastic resin (C) of the multi layer film but lower than any melting point of the core component of the conjugate fiber or of the thermoplastic resin (D) of the multi layer film.

By this treatment, a minute three-dimensional network of fibers that are melt-bonded at their contact points is formed inside the fibrous layer where fibers are fully entangled, and the fibrous layer and the multi-layer film are melt-bonded to each other to reinforce the three-dimensional network.

The thus-obtained processable sheet of the present invention is light in weight, has high rigidity, and can be readily processed by a thermal press. Therefore, it is very useful as an interior material for automobiles and airplanes. Moreover, since the processable sheet of the invention is made only of thermoplastic resins, chips and scraps of the sheet can be recycled by cutting, reducing into pieces, and melting them for using it again as a thermoplastic resin starting material.

sheet was needle-punched under a condition of 40 needles/cm$^2$ to obtain a fibrous layer.

Separately, a multi-layer film with a three layer structure was prepared using the above-mentioned propylene homopolymer as an intermediate layer having a thickness of 250 μm, and upper and lower layers made of the above-mentioned random copolymer, each having a thickness of 75 μm, that sandwiched the intermediate layer. The resulting multi-layer film was superposed on both surfaces of the fibrous layer and heated in a furnace of 150° C. for 5 minutes. Thereafter, the heat-treated material was compressed and cooled with a press having a 2 mm gap to obtain a processable sheet of the present invention.

The maximum flexural load measured in accordance with JIS (K 7203) was 1.0 kg/cm$^2$. Thus, the sheet was found to have excellent processability.

The data are shown in Table 1.

Examples 2–4 and Comparative Examples 1–3

Using the fibers and the films in Table 1, a variety of multi-layer sheets were prepared in a manner similar to that described in Example 1. In Comparative Example 3, the fibrous layer was not needled-punched. The maximum flexural load of each multi-layer sheet is also shown in Table 1.

TABLE 1

| | Fibrous layer | | | | Multi-layer film | | | Temp. of | Maximum | |
| | Single | | | | | | | | | |
| | filament fineness (denier) | Basis weight (g/m$^2$) | Sheath Component | Core Component | Thickness (μm) | Outer layer | Inner layer | thermal treatment (°C.) | flexural load (kg/cm$^3$) | Remarks |
|---|---|---|---|---|---|---|---|---|---|---|
| Ex. 1 | 15 | 300 | LMPP | PP | 300 | LMPP | PP | 150 | 1.0 | |
| Ex. 2 | 15 | 500 | LMPP | PP | 100 | LMPP | PP | 150 | 0.9 | |
| Ex. 3 | 15 | 300 | LDPE | PP | 150 | LDPE | HDPE | 125 | 0.5 | |
| Ex. 4 | 15 | 300 | LMPET | PET | 150 | LMPET | PET | 140 | 0.6 | |
| Comp. Ex. 1 | 15 | 300 | HDPE | PP | 100 | LMPP | PP | 150 | 0.1 | A) |
| Comp. Ex. 2 | 15 | 300 | LMPP | PP | 300 | PP | PP | 170 | — | B) |
| Comp. Ex. 3*) | 15 | 500 | LMPP | PP | 300 | LMPP | PP | 150 | 0.2 | C) |

*): In Comparative Example 3, the fibrous layer was not needle-punched.
LMPP: Low-melting point polypropylene
PP: Polypropylene
LDPE: Low-density polyethylene
HDPE: High-density polyethylene
LMPET: Low-melting point polyester
PET: Polyethylene terephthalate
A): Delamination
B): Film formation
C): Delamination

EXAMPLES

Example 1

A sheath component formed of a random copolymer (low melting point thermoplastic resin) consisting of 6% ethylene and 94% propylene and a core component formed of a propylene homopolymer (high-melting point thermoplastic resin) were spun in a proportion of 1:1 to prepare a conjugate fibers with a fineness of 15 denier (single filament). The fibers were carded and formed into a sheet having a basis weight (weight per unit area) of 300 g/m$^2$, after which the Example 5

From each of the processable sheets obtained in Example 1, a test piece (50 cm long×30 cm wide) was cut out. The test piece was preheated at 150° C., and subsequently, it was compressed and cooled with a press so that its both ends, each end having a length of 5 cm in the longitudinal direction, were bent downward by a degree of 60° to obtain a processed material. The bending process was easily carried out, and the resulting material had excellent shape-retainability.

Comparative Example 4

Blended fibers containing 50% of glass fibers each having a thickness of 12 μm and 50% of high-density polyethylene fibers each having a fineness of 6 denier (single filament) were processed into a sheet using a carding machine in a manner similar to that described in Example 1. On both upper and lower surfaces of the sheet, a high density polyethylene film having a thickness of 100 μm was superposed. The resulting layered material was thermally-treated and press-cooled as in Example 1 to obtain a multi layer sheet. This sheet had a rough surface from which glass fibers protrude, and therefore, it provided a disagreeable touch to the skin.

Example 6

On both surfaces of the fibrous layer of Example 1, a multi-layer film containing a propylene homopolymer layer with a thickness of 75 μm and a low melting point-polypropylene layer with a thickness of 75 μm was superposed so that the low melting point-polypropylene layer contacted the fibrous layer. The resulting material was subjected to a thermal treatment described in Example 1 to obtain a processable sheet. The maximum flexural load of this sheet was 0.9 kg/cm$^2$, and it was found to have excellent processability.

Example 7

On one surface of the fibrous layer of Example 1, a multi-layer film used in Example 6 was superposed so that the low melting point-polypropylene layer contacted the fibrous layer. The resulting material was subjected to a thermal treatment in a manner similar to that described in Example 1 to obtain a processable sheet. The maximum flexural load of this sheet was 0.6 kg/cm$^2$, and it was found to have excellent processability.

As described above, the processable sheet of the present invention is inexpensive and has excellent rigidity. It can be manufactured easily and safely using ordinary apparatuses and machines such as a carding machine and a furnace.

What is claimed is:

1. A processable sheet comprising a fibrous layer and a multi-layer film on either surface or both surfaces of the fibrous layer wherein:

the fibrous layer has a basis weight in the range of 300 g/m$^2$ to 500 g/m$^2$ and comprises highly entangled conjugate fibers each of which has a structure of a core and a sheath therefor, the core being made of a high melting point-thermoplastic resin (B) selected from the group of polypropylene and polyester, and the sheath being made of a low melting point-thermoplastic resin (A) selected from the group of a low-melting point polypropylene, a low density polyethylene and a low-melting point polyester, having a melting point lower than that of resin (B), the multi-layer film comprises an outer thermoplastic resin (C) selected from the group of a low-melting point polypropylene, a low density polyethylene and a low-melting point polyester, having a melting point lower than that of resin (B), which is highly compatible with the low melting point-thermoplastic resin, and contact points of the conjugate fibers are melt-bonded, and the fibrous layer and the multi-layer film are melt-bonded to each other.

2. The processable sheet of claim 1 wherein said multi-layer film includes at least one layer of a second thermoplastic resin (D) with a melting point higher than that of thermoplastic resin (C).

3. A processable sheet according to claim 1 wherein said multi-layer film has a thickness in the range of 100 μm to 300 μm.

\* \* \* \* \*